April 13, 1965 DE LOSS J. TANNER 3,178,648

TRANSISTORIZED AMPLIFIER UTILIZING AN INPUT TRANSFORMER BOOTSTRAP CONFIGURATION

Original Filed Jan. 8, 1960

INVENTOR.
DeLoss J. Tanner
BY
John J. Kowalik
Att'y.

3,178,648

TRANSISTORIZED AMPLIFIER UTILIZING AN INPUT TRANSFORMER BOOTSTRAP CONFIGURATION

De Loss J. Tanner, 74 Hamilton St., Bensenville, Ill.

Continuation of application Ser. No. 1,360, Jan. 8, 1960. This application June 18, 1962, Ser. No. 205,170
6 Claims. (Cl. 330—19)

This invention relates to electronic intercommunication apparatus and more specifically to a novel transistor circuit therefor. This application is a continuation of the application filed January 8, 1960, entitled "Transistorized Intercommunication System," and assigned Serial No. 1,360, now abandoned.

A general object of the invention is to provide a low cost, battery operated, transistorized intercommunication device which can be easily installed and operated by non-technical personnel.

A further object is to provide a circuit which is cost and performance optimized so that it provides exceptional performance at very low cost.

A different object is to provide a circuit which is battery operated and switched so that power is utilized only during use, which should prolong the life of the battery to a point where under normal usage it would approach shelf life.

Another object is to devise a circuit which uses low impedance speakers for economy and to minimize hum pickup between the main and subunits to a point where the signal leads do not have to be shielded.

A different object is to provide a circuit in which the input transformer is utilized in a "bootstrapping" arrangement to eliminate coupling components between the two transistor stages in the circuit.

A still further object is to provide a simple volume control which, in addition to controlling volume also controls battery drain.

A still further object is to provide, without adding special components, a novel amplifier circuit incorporating series current limiting to reduce the possibility of transistor failure through overloading.

These and other objects and advantages will become more apparent from the specification and the drawings, wherein.

Figure 1:
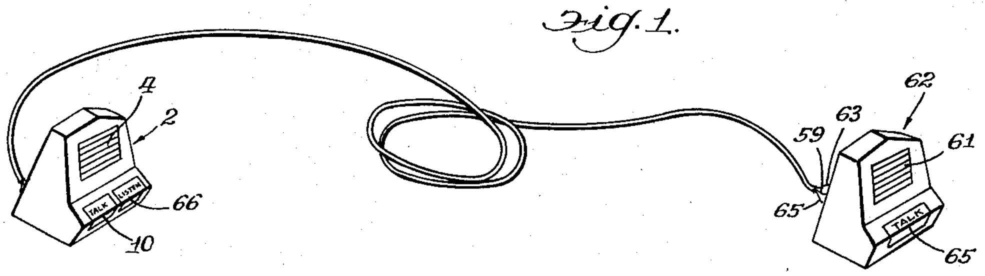
FIGURE 1 is a perspective of a two unit intercommunication apparatus made in accordance with the invention.
Figure 2:
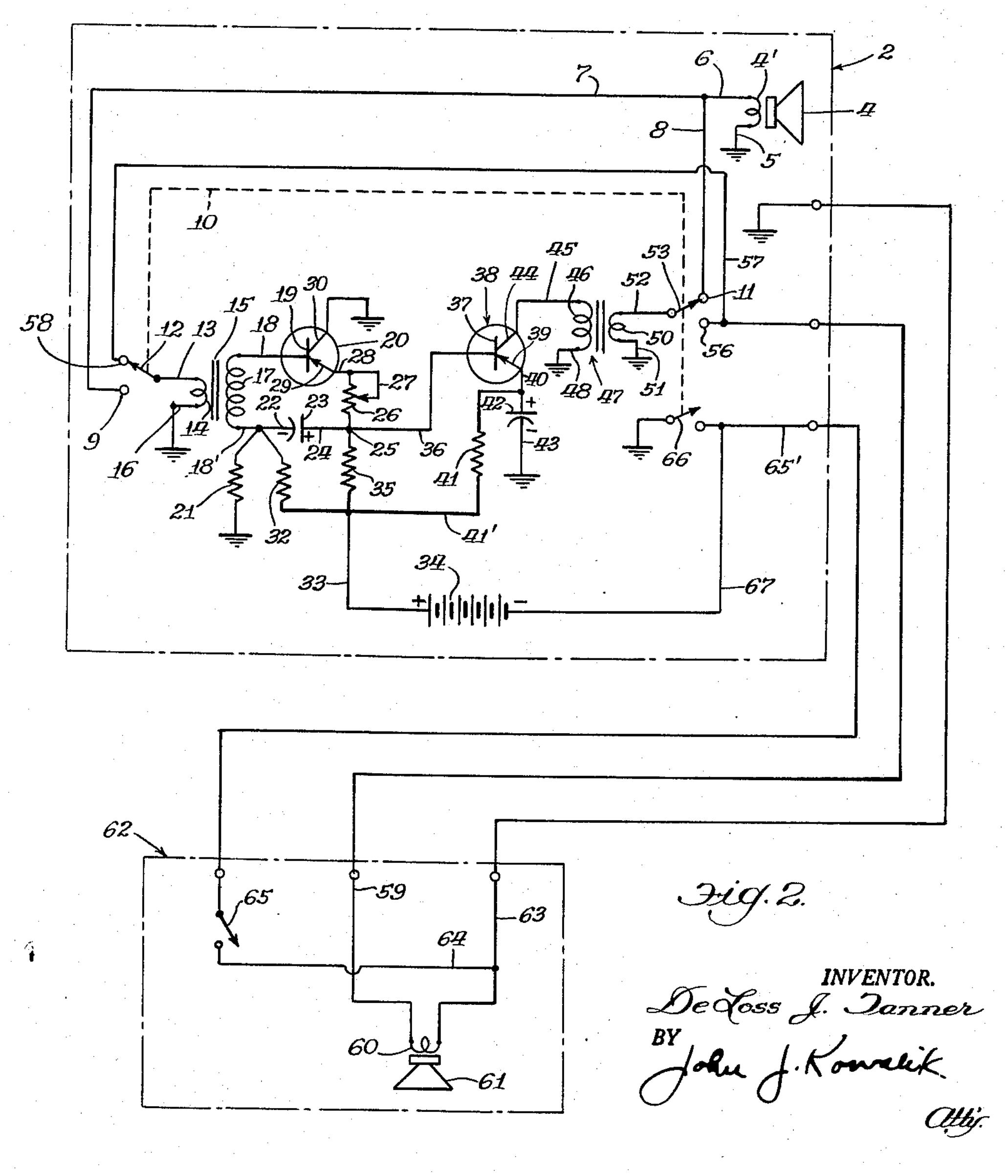
FIGURE 2 is a schematic circuit diagram of the invention.

Describing one embodiment of the invention in detail and having particular reference to the drawings, there is shown a two station intercommunication system comprising a main unit generally designated 2 housed in a suitable casing 3 and comprising a combination speaker and microphone 4 which, in this embodiment, has a low impedance 3.2 ohm voice coil 4' with a grounded lead 5 and a lead 6 which is connected to branch lines 7 and 8, the line 7 being connected to a contact 9 of a switch 10 and line 8 to a contact 11 of switch 10.

The switch 10 is a double throw double pole spring return type and has its pole member 12 connected to one lead 13 of the primary winding 14 of an input transformer 15, the winding 14 having its other lead 16 grounded.

The transformer 15 has its secondary winding 17 connected through one lead 18 to the base 19 of a first transistor 20 and the opposite lead 18' of winding 17 is connected through a resistor 21 to ground and to the negative lead 22 of an electrolytic condenser 23, the positive lead 24 of condenser or capacitator 23 being connected to one end 25 of a volume control resistance 26 which is connected by its variable arm connection 27 and at the other end to a lead 28 which connects to the emitter 29 of the transistor 20. The collector 30 of transistor 20 is grounded. The lead 18' is also connected through the resistor 32 to the positive lead 33 of the battery 34, and this lead 33 is also connected through a resistor 35 to the line or lead 36 which is connected to the base 37 of the second transistor 38, the emitter 39 of which is connected to the lead 40 which connects to one end of a resistor 41 which at its other end is connected by lead 41' to the positive battery lead 33. The lead 40 is also connected to the positive side of an electrolytic condenser 42 which has its negative side grounded through lead 43. Those skilled in the art will recognize that other battery connections can be used, with appropriate circuit connections to apply the requisite operating potentials throughout the circuit.

The collector 44 of the transistor 38 is connected through lead 45 to the primary winding 46 of an output transformer 47, the winding 46 being connected through lead 48 to ground.

The secondary winding 50 of transformer 47 is connected through lead 51 to ground and through lead 52 to pole element 53 which in its normal position engages contact or point 11 of switch 10.

The pole element 53 is adapted to contact the point 56 which is connected through line 57 to contact 58 of switch 10 which connects to lead 13 of the input transformer primary winding 14.

Contact 56 is also connected to line 59 which is connected to one end of voice coil 60 of the speaker-microphone 61 of the sub unit 62, the coil 60 being connected through lead 63 to ground and through line 64 to a single pole single throw switch 65 which is connected through line 65' to a single pole single throw switch 66 to ground and before the switch 66 to the lead 67 which is connected to the negative side of the battery 34. If desired, the switching arrangement in the main unit can be a three-position switch, biased to return to the neutral position from either the "talk" or "listen" position.

It will be understood that the switching arrangement is simplified and requires only three conductors 63, 59, 65' between the main and sub units. This was accomplished by having what would normally be only a simple return on-off switch 65 in the sub-unit serve also as a push-to-talk switch.

The second spring return switch 66 in the main unit, also connected as a power on-off switch, doubles as a push-to-listen switch when the push to listen button in the main unit is depressed. It is also actuated when the push-to-talk button (in the main unit) is pressed. However, the main unit's push-to-talk button also actuates another switch 10 which interchanges (in an electrical sense) the positions of the two speakers.

The transistor amplifier represents a second area of novelty in that it uses low impedance (3.2 ohm) speakers for economy (or the 8 ohm units which are now more widely used) and so that the signal leads between the main unit and subunits will not be subject to excessive hum pickup. Hum pickup is so low in fact, that it is not necessary to shield the interconnecting leads. The disadvantage of low impedance speakers of requiring both input and output transformers for reasonable efficiency is largely overcome by a special amplifier circuit which utilizes the input transformer in a "bootstrap" configuration to eliminate coupling components between the two transistor stages.

OPERATION OF THE DEVICE

Assuming that the subunit initiates a call the switch 65 is depressed connecting the negative end of the battery 34 to the ground system. The electron flow is from the battery 34 through lead 65′, switch 65 and lead 63. The main unit circuit is energized, and the operator then speaks into the speaker unit 61 while holding the switch 65 closed. The speaker 61 generates a small fluctuating voltage corresponding to the user's voice. The signal voltage travels through lead 59 and lead 63 to the main unit 2 where it reaches the primary 14 of the input transformer 15 via part of switch 10 through contacts 12, 58. The voltage is stepped up by the transformer 15 and fed into the input electrode or base of the first transistor 20 which is connected in a "bootstrap" configuration, that is, the secondary 17 of the input transformer 15 returns to the top end of the major emitter resistance 35 (through a D.C. blocking capacitor 23) rather than the bottom end of resistance 35, so that the resistance 35 will not introduce emitter degeneration with consequent loss in gain.

The first stage may be considered a common emitter amplifier which has had its collector load moved to the opposite end of the battery. The result of this arrangement is that a voltage amplification is achieved which would not be possible with a conventional emitter follower circuit using a junction transistor.

It will be noted that if a conventional common emitter stage were used in place of the circuit shown, the D.C. voltage on the first transistor's collector would be too high to correctly bias the output stage base. A coupling capacitor would therefore have to be added to block D.C. and two extra resistors (for biasing the output base) would be necessary. Besides the added cost the power taken by such resistors would cause gain loss and add to battery drain. A second reason for the special circuit shown in the first stage is that the D.C. current amplification provided by transistor 20 is used to supply a stable D.C. bias for the output base 37 and only one set of base biasing resistors 32 and 21 is needed for both stages. The second stage 38 is indirectly biased by 32 and 21 through 20, which is a conventional emitter follower in so far as D.C. is concerned. The effect of current amplification of 20 is the same as though much lower value base biasing resistors were used for the output stage 38. In addition to saving parts, the battery drain is lowered (low resistance output base biasing resistors would increase the battery current drain). Good bias stability is necessary in transistor circuits to overcome the effects of temperature changes which cause variations in transistor characteristics.

The 1000 ohm resistor 35 was empirically chosen to produce maximum gain. Increasing or decreasing the value of this resistor more than 30% results in a noticeable gain loss.

The 500 ohm variable resistor 26 is inserted in series with the emitter of transistor 20 to serve two functions. First it is a simple volume control which reduces gain as the resistance is increased (this can be replaced by a fixed or set gain resistor or by a short) because of emitter degeneration introduced. It also has an effect on the output base bias 37 and therefore an effect on the output collector 44 current. The collector current at 37 drops as the resistance of the volume control resistance 26 increases, providing a "battery saver" feature with low volume settings. There are two advantages of the emitter degeneration type gain control as used here over the conventional potentiometer volume control hook up. The first is that the control does not introduce an insertion loss as the inclusion of a potentiometer across the secondary winding 17 would do and second, the minimum gain that the control can be set to is purposely limited. This is accomplished without adding a resistor, as would be necessary with a potentiometer hook up. The minimum gain is limited so the control cannot be turned so low that parties at either end of the system cannot call each other.

The output stage 38 is a single ended class "A" common emitter connected transistor with a 47 ohm emitter resistor 41. The value of resistor 41 was chosen in conjunction with the values of resistors 21, 35, 32, the output transformer 47, and the supply voltage to provide as much power output as is practical consistent with low battery drain and good bias stability. Note that the emitter by pass capacitor 42 does not go across the emitter resistance, but connects to ground instead. The primary reason for this is to obtain protection against damage to the output transistor by the high initial surge current that would otherwise be present immediately after power is applied and before the capacitor 42 has a chance to charge up.

The positive end of the battery is not connected to either transistor or to any capacitor but must go through the resistances 32, 35 and 41. The surge current limiting these unbypassed resistors provide is particularly important in the present system because the power will be turned on and off many times during normal operation. This innovation will result in substantial improvement in reliability by minimzng the possibiltiy of transistor breakdown.

The value of the output stages emitter bypass 42 is not excessively large (considering its location in the circuit) in that the lower capacity electrolytics are lower priced and second the value was selected to reduce hum and low frequency noise, without being low enough to affect voice frequencies.

The audio output transformer 47 matches the relatively high output impedance of 38 with the 3.2 ohm speaker impedances.

*Intercom switching*

As indicated earlier, the switching arrangement has been greatly simplified, especially if the following is considered:

A. The only time power is taken from the battery is when someone pushes one of the spring return buttons.

B. Only three interconnecting leads are needed between the main and sub units.

C. The main unit has a "press to listen" button in addition to the press to talk button. This is what might be called an "eavesdropping" feature.

To simplify the discussion of the switching, it is convenient to divide the switching functions into two general categories—viz, speaker switching and power on-off switching. A D.P.D.T. switch is used as a speaker switch. This is a spring return type which is connected so that the sub unit speaker is normally hooked to the amplifier input and the main unit speaker to the amplifier output. When this switch is depressed, the main unit speaker is connected to the input and the sub unit speaker to the output.

The two power on-off switches 65 and 66 are connected in parallel and placed in series with the battery so that either can connect the battery to the amplifier when actuated. Note that one of the leads to the on-off switch (push to talk) in the sub unit is also used as one of the speaker wires. Without this sharing of the black lead 63, four wires would be necessary between units instead of three.

*Hookups for different "modes" of operation*

(1) *Press to talk switch in the sub unit is pressed.*—Since the D.P.D.T. switch 10 in the main unit is normally positioned so the sub unit speaker is connected to the amplifier input, pressing switch 65 enables someone at the sub unit to talk to someone at the main unit.

(2) *Press to listen button in main unit is pressed.*—This does the same thing as the press to talk switch in the sub unit does, except that since the operator is at the main unit, he will hear sound originating at the sub unit.

(3) *Press to talk switch in the main unit is pressed.*—Since the speaker in the main unit must be the "microphone" for this mode of operation, the D.P.D.T. switch is actuated to exchange the position of the speakers in the system. This alone is not enough to make the system work, however, because the battery would not be connected to the amplifier. Accordingly, when the push to talk button in the main unit is pressed, it also actuates switch 66, which "turns the unit on."

LIST OF PARTS

| Reference Numerals | Item | Description |
|---|---|---|
| 4 and 61 | Speakers | 3.2 ohms. |
| 10 | Ganged Double Throw Double Pole Spring Return Switch. | |
| 15 | Input Transformer | 3.2 ohms to 2,000 ohms. |
| 20 and 38 | Transistors | RCA-2N270 or equivalent. |
| 21 | Resistor | 47K ohms. |
| 23 | Electrolytic Condenser Volume Control. | 4MF-6 volt 500 ohms. |
| 32 | Resistor | 6.8K ohms. |
| 34 | Battery | 9 volts. |
| 35 | Resistor | 1,000 ohms. |
| 41 | Resistor | 47 ohms. |
| 42 | Electrolytic Condenser | 50 mf.—15 Volts. |
| 47 | Output transformer | 500 ohms to 3.2 ohms. |
| 65 and 66 | Single pole Single throw switches. | |

I claim:

1. In a multistage amplifying circuit, a source of potential having positive and negative poles, first and second transistors each having a base, collector, and emitter, a transformer having primary and secondary windings, an input circuit having one end connected to ground and the other end to one end of the primary winding which has its other end connected to ground, said secondary winding having one end connected to the base of the first transistor, a resistance connecting the other end of the secondary winding to ground, a capacitor and variable resistance connected between said other end of the secondary winding and the emitter of the first transistor, a connection from between the capacitor and the variable resistance to the base of the second transistor, a resistor connected between the positive pole and said other end of the secondary winding, a resistor connected between the positive pole and the base of the second transistor, a resistor connected between the positive pole and the emitter of the second transistor, a capacitor connected between the emitter of the second transistor and ground, a transformer having a primary bridged between the collector of the second transistor and ground and having a secondary output, a ground connection between the collector of the first transistor and ground, and a ground connection between the negative pole and the ground.

2. An amplifying circuit for energization from a source of potential having first and second poles comprising first and second semiconductor units, each unit having input, output, and common electrodes, a first transformer having primary and secondary windings, an input circuit including said primary winding, means for coupling one end of said secondary winding to the input electrode of the first unit, means including a first resistance for coupling the other end of said secondary winding to ground, a first capacitor having one plate coupled to said other end of the secondary winding, means including a variable resistor for intercoupling the other plate of said capacitor to the output electrode of said first unit, means for coupling the common electrode of said first unit to ground, means for coupling the input electrode of said second unit to the common connection between said capacitor and said variable resistor, a second resistance intercoupled between said other end of the secondary winding and said first pole, a third resistance coupled between said common connection and said first pole, a fourth resistor coupled between the common electrode of the second unit and said first pole, a second capacitor intercoupled between said common electrode of the second unit and ground, a second transformer having primary and secondary windings, means including the primary winding of said second transformer for coupling the output electrode of the second unit to ground, and means for grounding said second pole of the potential source.

3. A two-stage transistor amplifier circuit for use between the secondary winding of an input transformer and the primary winding of an output transformer, said circuit being energized from a potential source having first and second poles, comprising input, output and common electrodes in each transistor, means for intercoupling one end of said secondary winding and the input electrode of the first transistor, means for intercoupling the common electrode of the first transistor and ground, means including a first transistor for intercoupling the other end of said secondary winding and ground, means including a second resistor for intercoupling said other end of the secondary winding and said first pole, means including a first capacitor for intercoupling said other end of the secondary winding and the input electrode of said second transistor, means including a variable resistance intercoupled between the output electrode of said first transistor and the common connection between said first capacitor and the input electrode of said second transistor, means including a third resistor intercoupled between said common connection and said first pole, means including a fourth resistor intercoupled between the common electrode of said second transistor and said first pole, means including a capacitor intercoupled between the common electrode of said second transistor and ground, means for intercoupling said primary winding between the output electrode of said second transistor and ground, and means for coupling said second pole to ground.

4. A two-stage transistor amplifier circuit for use between the secondary winding of an input transformer and the primary winding of an output transformer, said circuit being energized from a potential source having first and second poles, comprising input, output and common electrodes in each transistor, means for intercoupling one end of said secondary winding and the input electrode of the first transistor, means for intercoupling the common electrode of the first transistor and ground, means including a first transistor for intercoupling the other end of said secondary winding and ground, means including a second resistor for intercoupling said other end of the secondary winding and said first pole, resistance means intercoupled between the output electrode of said first transistor and said first pole, a capacitor intercoupled between the other end of said secondary winding and a point on said resistance means, means for coupling the input electrode of said second transistor to a point on said resistance means, a third resistor intercoupled between the common electrode of said second transistor and said first pole, means including a capacitor intercoupled between the common electrode of said second transistor and ground, means for intercoupling said primary winding between the output electrode of said second transistor and ground, and means for coupling said second pole to ground.

5. In a transistorized amplifier constructed for energization from a source of potential having positive and negative poles, at least two transistors each having input, output and common electrodes, an input transformer including a secondary winding and an output transformer including a primary winding, means for coupling one end of said secondary winding to the input electrode of said first transistor, a first resistor coupled between the other end of said secondary winding and a reference circuit connection, a second resistor coupled between said other end of the secondary winding and a first one of said poles, resistance means coupled between the output electrode of said first transistor and said first pole, means for coupling the common electrode of said first transistor to said reference connection, a first capacitor coupled between said other end of the secondary winding and a point on said resistance means, means for coupling the input electrode of said second transistor to a point on said resistance means, a third resistor coupled between the common electrode of said second transistor and said first pole, a second capacitor coupled to said common electrode of said second transistor to effectively bypass said third resistor, means for coupling said primary winding between the output electrode of the second transistor and said reference connection, and means for coupling the other of said poles to said reference connection.

6. For energization from a source of potential having first and second poles, an amplifying circuit coupled between a pair of input conductors and a pair of output conductors including at least two transistors, each transistor having input, common, and output electrodes, means for coupling both the common electrode of the first transistor and one of said output conductors to a reference connection, means for coupling one of said input conductors to the input electrode of said first transistor, means for coupling the other of said input conductors through a first resistor to said reference connection and through a second resistor to said first pole, resistance means, of which at least a portion is variable, coupled between the output electrode of said first transistor and said first pole, a first capacitor coupled between said other input conductor and said resistance means, means for coupling the input electrode of said second transistor to said resistance means, means for coupling the output electrode of said second transistor to the other of said output conductors, a third resistor coupled between the common electrode of said second transistor and said first pole, a second capacitor coupled to said common electrode of the second transistor, and means for intercoupling said reference connection with said second pole of the potential source.

References Cited by the Examiner

UNITED STATES PATENTS

| | | | |
|---|---|---|---|
| 2,762,874 | 9/56 | Barco | 330—29 |
| 2,878,380 | 4/59 | Holmes | 330—24 |
| 2,883,456 | 4/59 | Jaenke et al. | 179—1.4 |
| 2,916,565 | 12/59 | Ensink et al. | 330—19 |
| 2,927,276 | 4/60 | Herrmann | 330—19 |
| 2,985,842 | 5/61 | Eklov | 330—19 |
| 3,067,286 | 12/62 | Webb | 179—1.4 |

FOREIGN PATENTS 1,184,826 7/59 France.

OTHER REFERENCES

Garner, "Transistor Guitar Amplifier," Radio and Television News, November 1953, pages 74, 75, 192.

ROY LAKE, *Primary Examiner.*

WILLIAM C. COOPER, NATHAN KAUFMAN, *Examiners.*